United States Patent [19]
Loewe

[11] Patent Number: 5,616,196
[45] Date of Patent: Apr. 1, 1997

[54] DEFORMATION-BASED TIRE INFLATION DEVICE

[76] Inventor: Richard T. Loewe, 12882 Olympia Way, Santa Ana, Calif. 92705

[21] Appl. No.: 512,773

[22] Filed: Aug. 9, 1995

[51] Int. Cl.$^6$ ................................................ B60C 23/12
[52] U.S. Cl. .......................................................... 152/426
[58] Field of Search ................................ 152/424, 425, 152/426; 417/231, 233

[56] References Cited

U.S. PATENT DOCUMENTS

| | | | |
|---|---|---|---|
| 540,519 | 6/1895 | Stanford | 152/425 |
| 561,628 | 6/1896 | Tomlinson | 152/425 |
| 1,128,455 | 2/1915 | Keith | 152/418 |
| 1,229,039 | 6/1917 | Crane | 152/420 |
| 2,577,458 | 12/1951 | Gaiptman | 152/416 |
| 3,099,309 | 7/1963 | Congost Horta | 152/416 |
| 3,511,294 | 5/1970 | Bepristis | 152/418 |
| 4,154,279 | 5/1979 | Tsuruta | 152/416 |
| 4,313,483 | 2/1982 | Brockmann | 152/416 |
| 4,418,737 | 12/1983 | Goodell et al. | 152/416 |
| 4,582,107 | 4/1986 | Scully | 152/417 |
| 4,583,566 | 4/1986 | Kalavitz | 137/101.19 |
| 4,619,303 | 10/1986 | Bryan et al. | 152/416 |
| 4,685,501 | 8/1987 | Williams | 152/417 |
| 4,744,399 | 5/1988 | Magnuson et al. | 152/417 |
| 4,754,792 | 7/1988 | Braun et al. | 152/417 |
| 4,763,709 | 8/1988 | Scholer | 152/416 |
| 4,875,509 | 10/1989 | Da Silva | 141/38 |
| 4,924,926 | 5/1990 | Schultz et al. | 152/417 |
| 5,325,902 | 7/1994 | Loewe et al. | 152/419 |

FOREIGN PATENT DOCUMENTS 1011756  7/1957  Germany.

Primary Examiner—Michael W. Ball
Assistant Examiner—Francis J. Lorin
Attorney, Agent, or Firm—Stetina Brunda & Buyan

[57] ABSTRACT

A device for automatically maintaining desired air pressure within a vehicle tire utilizes deformation of the rotating tire where it contacts the road surface to operate an air compressor. The air compressor is formed in the wheel and connected to the tire, the compressor responsive to deformation of the tire causing compressed air to pass into the tire. The compressor is preferably of a reciprocating piston type having a cylinder adapted to receive a sliding piston, the piston preferably slidably received within a plunger in contact with the inside of the tire. A spring is preferably disposed between the plunger and the piston to limit the motion of the piston to a fixed displacement less than the deformation of the tire, such that the tire inflation system is operable for a wide range of deformations of the tire. Additionally, a centrifugal intake valve is preferably provided that seals off the inlet passageway to the air compressor and opens only when the wheel is rotating rapidly enough so that centrifugal force on potential liquid or particulate contaminants expels such contaminants. Advantageously, the tire inflation device of the present invention is entirely contained within the wheel, without the need for a rotating joint to the vehicle body or frame.

8 Claims, 1 Drawing Sheet

DEFORMATION-BASED TIRE INFLATION DEVICE

FIELD OF THE INVENTION

The present invention relates generally to fluid pressure control apparatus, and more particularly to an automatic tire pressure inflation device which is entirely contained within a vehicle wheel, for maintaining a desired inflation pressure within a tire mounted on said wheel.

BACKGROUND OF THE INVENTION

Maintaining correct inflation pressure in automobile tires is accepted as an effective way to increase fuel economy, decrease tire wear and increase safety. Although proper tire inflation may be maintained by regularly checking tire pressure and adjusting accordingly, such maintenance tends to be largely ignored because of the inconvenience involved. Additionally, tire pressure varies based upon the pressurized air temperature and recent driving conditions sustained by the tire. Varying tire inflation pressure depending upon the road surface offers other benefits such as improved traction, or an increase in tire pressure may be desirable to offset changes in the vehicle payload.

The need for, and interest in, finding a practical means of maintaining proper tire pressure is illustrated by at least 19 patents granted since 1915, at least 13 of which have issued since 1979. Most of the prior art patents involve devices that are not self-contained on a wheel, but rather rely on parts mounted on the vehicle body or frame and additionally require some type of rotating joint, be it mechanical, electrical or pneumatic. Such rotating joints are expensive and impractical in the adverse environment in which vehicle wheels operate, including contaminants such as oil, water, dirt and sand which tend to attack seals necessarily a part of such rotating joints.

For example, U.S. Pat. No. 5,325,902 issued to Loewe et al., and hereby incorporated by reference, describes an automatic tire pressure monitor and inflation system having an electric motor, an air compressor disposed upon the rotating wheel, and an electrical generator. The generator includes coils mounted on the rotating wheel and a magnet mounted on a non-rotating portion of the vehicle. Thus, this system includes a rotating connection, albeit without physical contact, in which the wheel-mounted components of the generator will interact with the vehicle-mounted components thereof, to induce a voltage for driving the electric motor.

Other contemplated apparatus contained entirely on a rotating vehicle wheel include stored compressed gas or stored energy sources on the wheel which must be periodically recharged or replaced, offering limited advantages over conventional means of filling tires from stationary compressors. Thus there remains a need in the art for an apparatus fully contained on a vehicle wheel for maintaining desired inflation pressure within a tire, without the need for additional components on the frame or body portions of the vehicle, and without the need for replenishment of batteries or cartridges.

SUMMARY OF THE INVENTION

The present invention comprises a device and method for maintaining desired inflation pressure within a tire mounted on a rotating wheel on a vehicle, utilizing repeated deformation of the tire where it contacts the ground. The device includes a small air compressor formed in the wheel in communication with the pressurized tire, responsive to deformation of the tire where it contacts the ground causing compressed air to flow into the tire. As such, desired air pressure in the tire is maintained directly from the normal rotation of the vehicle wheel by means entirely contained on the wheel.

The preferred embodiment includes a small reciprocating piston type compressor, having a cylinder adapted to receive a sliding piston responsive to deformation of the tire, forcing the piston inward on a compression stroke. The compressor is oriented in the wheel such that rotation of the wheel generates a centrifugal force on the piston forcing it radially outward on the intake stroke. The preferred embodiment of the invention further includes a plunger in contact with the inside of the tire and slidably connected to the piston, and a spring disposed between the plunger and the piston. This mechanical arrangement enables a constant piston displacement responsive to a wide range of deformations of the tire. The compressor of the present invention also preferably includes an inlet passageway configured with a centrifugal intake valve, such that the inlet passageway is unsealed only when the wheel is rotating at a rate sufficient to prevent contaminants from entering therein.

The present invention maintains desired inflation pressure in the tire as follows. The repeated deformation of the rotating tire where it contacts the ground is transferred to a small air compressor, preferably of the reciprocating piston type. A plunger is disposed between the inside of the tire and the piston such that the motion of the tire deformation where the plunger contacts the inside of the tire is transferred to the piston compression stroke, through an intermediary spring between the plunger and piston. When the point at which the plunger contacts the inside of the tire is not in contact with the ground, centrifugal force on the piston and plunger force them radially outward, providing the intake stroke of the compressor. A spring coupling between the plunger and piston provides a constant piston displacement responsive to a wide variation in tire deformation. A centrifugal valve in the inlet passageway to the compressor is normally closed by spring pressure, and is opened by centrifugal force when the rotational speed of the wheel is great enough so that the centrifugal force on potential liquid or particulate contaminants expels them away from the inlet passageway, preventing their entry into the compressor. Overcoming normal leakage rates from vehicle tires require extremely low flow rates from the compressor, requiring extremely low force derived from the deformation of the tire. This invention is analogous to trickle charging a battery to keep it at full charge.

The device and method of the present invention maintain desired inflation pressure within a rotating tire, utilizing only repeated deformation of portions of the tire contacting the ground to operate an air compressor. All components of the device are attached to the vehicle wheel, eliminating the need for any contact with the vehicle body or frame. The invention does not require a gas cartridge or battery mounted to the vehicle wheel, which would need to be periodically replaced or recharged. Further aspects, objects and advantages will become apparent to those skilled in the art upon reading and understanding of the following detailed description and the accompanying drawings.

DETAILED DESCRIPTION OF THE PREFERRED EMBODIMENT

The following detailed description and the accompanying drawings describe and illustrate a presently preferred embodiment of the invention only, and are not intended to limit the scope of the invention in any way.

Figure 1:
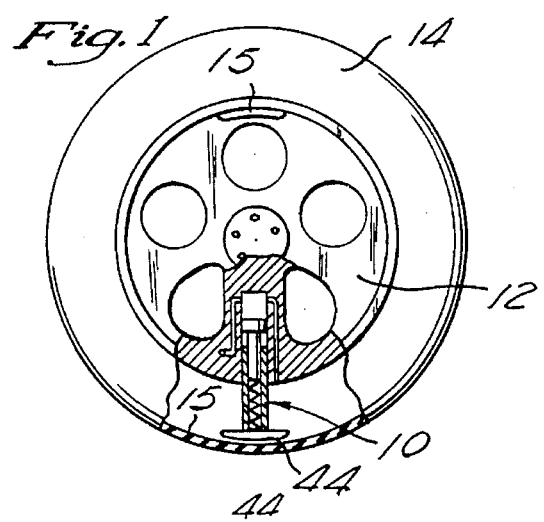
FIG. 1 is a side view of a vehicle wheel and tire, including a cross-sectional view of the present invention formed therein.

The deformation-based tire inflation device 10 of the present invention is illustrated in FIGS. 1 through 5 which depict a presently preferred embodiment of the invention. Referring first to FIG. 1, the environment of the present invention is a wheel 12 that supports a tire 14 mounted to said wheel.

Figure 5:
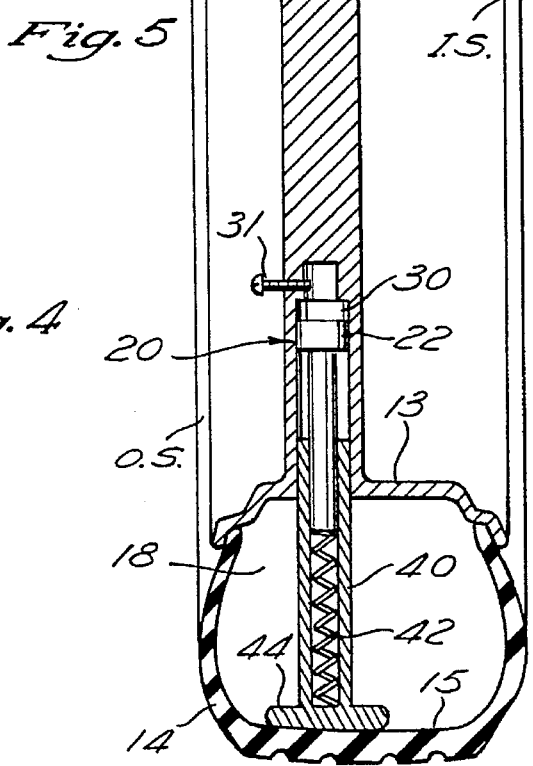
FIG. 5 is an enlarged front-sectional view of the device of the present invention.

Now also referring to FIG. 5, the tire inflation device 10 includes a reciprocating piston type air compressor 20 built into the vehicle wheel 12, having a piston 22 slidably received within a plunger 40, having a bearing pad 44 that contacts the inside surface 15 of the tire 14. When the vehicle wheel 12 is oriented such that the tire 14 contacts the ground where the bearing pad 44 contacts the inside of the tire, the plunger 40 causes the piston 22 to slide inward in the compressor 20, constituting a compression stroke (see FIG. 2). When such deformation of the tire 14 contacting the bearing pad 44 is not present, centrifugal forces cause the piston 22 to slide outward in the compressor 20, constituting an intake stroke (see FIG. 3).

The tire inflation device 10 also preferably includes a compression spring 42 captive inside the plunger 40 which the piston 22 bears against. Incorporation of the compression spring 42 and elongate plunger 40 allows the tire inflation device 10 to operate for a wide range of deformation of the deformed portion 16 of the tire 14 with a limited piston displacement, i.e., the device will still operate and not be damaged by the road surface even when the tire 14 is completely flat. A balancing weight 15 may be required to maintain the wheel 12 in balance. Though the tire inflation device 10 shown here is formed in the vehicle wheel 12 between the pressurized volume 18 of the tire 14, it is contemplated that the device 10 could be configured to be physically located within the tire 14 pressurized volume 18 adjacent the wheel 12 outboard rim 13, possibly through use of a collapsible plunger 40 to accommodate maximum deformation.

Figure 4:
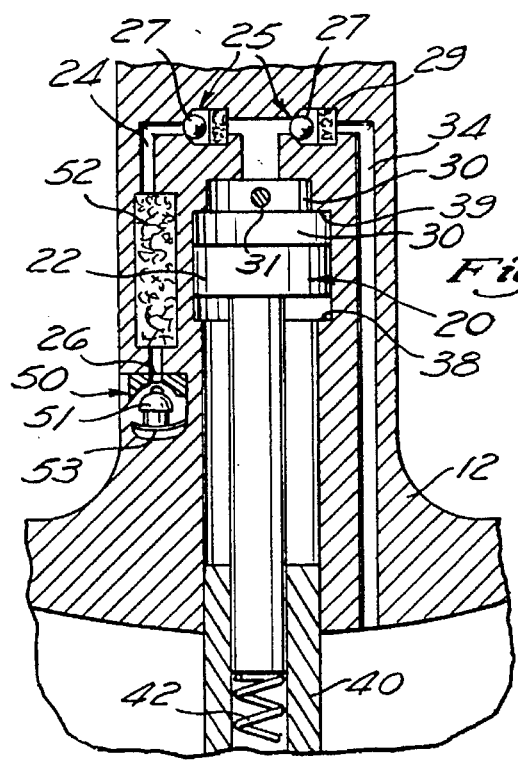
FIG. 4 is an enlarged side view of the compressor and the inlet and outlet passageways.

Now referring to FIG. 4, the air compressor 20 of the preferred embodiment of the present invention may be described. The compressor 20 includes an inlet passageway 24 through which air enters the compressor 20 cylinder 30. The compressor 20 also includes an outlet passageway 34 connected to the pressurized volume 18 of the tire 14. Contained in the inlet passageway 24 and outlet 34 passageway near the cylinder 30 are a pair of check valves 25, which provide one-way air flow from the intake orifice 26 and/or the cylinder 30 into the pressurized volume 18 of the tire 14. The check valves 25 each contain a solid neoprene ball 27 and a porous disc 29 (that allows air to flow through). The check valves 25 are arranged such that air is permitted to enter the inlet end and allowed to flow through the outlet end, as the disc 29 prevents the ball 27 from seating at the outlet end. The check valves 25 are also arranged such that centrifugal forces do not act upon the balls 27 to bias their movement.

The air compressor 20 further includes an adjustment screw 31 (see FIG. 5), located in the outside surface (O.S.) of the wheel 12 for accessibility. The adjustment screw 31 allows the minimum volume of the cylinder 30 of the compressor 20 to be manually varied, effectively changing the compression ratio of the compressor 20, thereby determining the maximum pressure applied to the pressurized volume 18 of the tire 14. Limiting the compression ratio of the compressor 20 limits the pressure generated by the compressor 20, preventing unintentional overinflation of the tire 14 and obviating use of a pressure relief valve. The adjustment screw 31 may be screwdriver operated to permit manual adjustments of the maximum pressure of the compressor 20, such an adjustment being calibrated with respect to air pressure at sea level or some other base altitude. Although the description of the preferred embodiment assumes a compressor 20 comprising a cylinder 30 and a piston rod 22, the possibility of utilizing other types of compressors is contemplated, such as a bellows compressor, a diaphragm compressor, a linear compressor, or a rotary compressor.

The inlet passageway 24 preferably includes a centrifugal intake valve 50 and filter 52. A centrifugal intake valve 50 is preferably of a spring 53 and plug 51 configuration, the valve 50 being normally closed by the metal strip spring 53 forcing the plug 51 to seal the intake orifice 26 through which air enters the inlet passageway 24. The centrifugal force on the mass of the plug 51 opens the centrifugal intake valve 50 when the vehicle wheel 12 is rotating at a rate sufficient for the centrifugal force on potential liquid and particulate contaminants to expel such contaminants from the intake orifice 26 and surrounding area. The centrifugal intake valve 50 permits immersion of the wheel 12 in water without allowing water into the inlet passageway 24. Because of the especially adverse environment in which vehicle wheels 12 operate, as a further precaution, a conventional air filter 52 is included in the inlet passageway 24 between the centrifugal intake valve 50 and the inlet check valve 25 to reduce the likelihood of contaminants entering the compressor 20.

Figure 2:
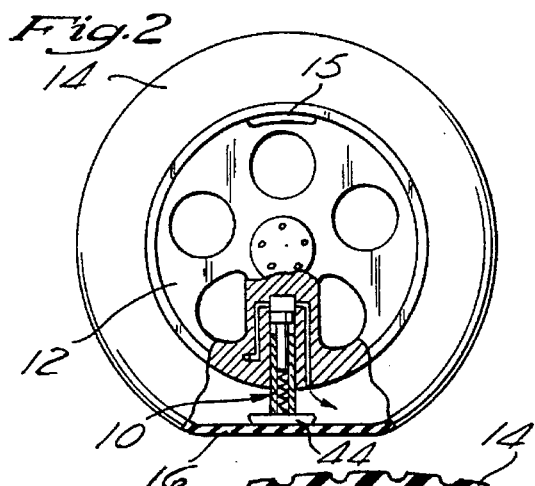
FIG. 2 is a side view showing the deformed tire and air passing from the compressor into the tire.
Figure 3:
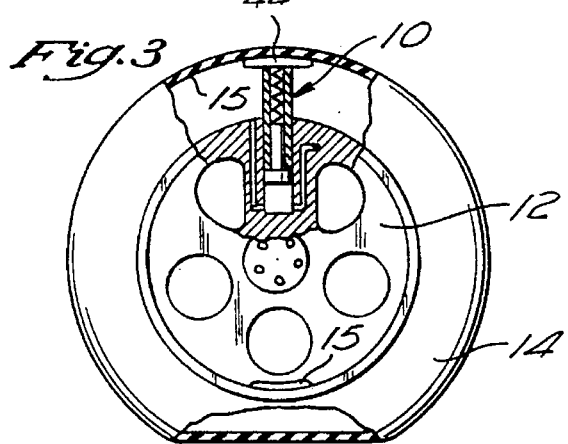
FIG. 3 is a side view showing the wheel rotated 180° and air entering the compressor.

Now referring to FIGS. 2 through 5, the operation and use of the deformation-based tire inflation device 10 may be more fully described. As the vehicle wheel 12 rotates, initially the portion of the tire 14 that the bearing pad 44 contacts is not deformed and a centrifugal force is placed upon the compressor 20 piston 22 (FIG. 3). As the vehicle wheel 12 rotates, centrifugal force moves the piston 22 radially outward thereby enlarging the volume in the compressor 20 cylinder 30. The increased volume inside the cylinder 30 lowers the pressure to below the outside air pressure, thereby causing outside air to flow through inlet passageway 24 and into the cylinder 30. An outer stop 38 (FIG. 4) limits the outward movement of the piston 22 to control the maximum displacement of the intake stroke.

As the vehicle wheel 12 continues to rotate, the tire 14 contacts the ground and is deformed at the point at which the bearing pad 44 contacts the tire 14 (FIG. 2). This causes the plunger 40 to slide inward radially. This inward motion is transferred to the piston 22 by means of the spring 42 until the piston 22 reaches the inner stop 39 (FIG. 4), after which the spring 42 compresses as the plunger 40 follows the full deformation of the tire. As the piston 22 and slides inward effectively reducing the volume in the compressor 20 cylinder 30, air in the compressor 20 cylinder 30 is pushed through the outlet passageway 34 and into the pressurized volume 18 of the tire 14. The compression spring 42 or other means disposed between the plunger 40 and the piston 22 make the tire device 10 operative for a wide range of deformations of the tire 14.

Each intake stroke of the piston rod 22 causes the check valve 25 in the inlet passageway 24 to open, drawing air into the intake orifice 26 through the centrifugal intake valve 50, through the filter 52 and into the compressor 20 cylinder 30. Thereafter, as the piston 22 undertakes the compression stroke, the check valve 25 in the inlet passageway 24 closes, and the check valve 25 in the outlet passageway 34 opens and the air contained within the cylinder 30 is expelled into the pressurized volume 18 of the tire 14.

It is understood that the tire inflation system 10 described herein and shown in the drawings represents only a presently preferred embodiment of the invention. Indeed, various modifications and additions including but not limited to those discussed above may be made to the preferred embodiment without departing from the spirit and scope of the invention. By way of example only, other means of transferring tire deformation to a compressor may be suitable, such as using the change in width of a tire caused by contact of the tire with the ground. These and other modifications may be obvious to those skilled in the art and may be implemented to adapt the present invention for use in a variety of different applications.

What is claimed is:

1. A device for maintaining desired inflation pressure within a tire mounted on a rotating wheel, said device utilizing deformation of said tire as it contacts the ground to pass air into the tire, the device comprising:

an air compressor formed in said wheel in fluid communication with the tire;

the compressor being of the reciprocating piston type, having a cylinder adapted to receive a sliding piston;

a plunger in contact with the inside of the tire and slidably connected to the piston; and a spring disposed between said plunger and the piston; deformation of the tire causing said plunger to compress said spring, said spring then moving said piston inside the cylinder so as to produce a compression stroke.

2. The device of claim 1, wherein:

the cylinder has adjusting means to vary the compression ratio, to control the maximum pressure produced by the compressor.

3. The device of claim 1, wherein:

the compressor has stopping means, to limit the movement of the piston.

4. The device of claim 1, wherein:

the compressor has an inlet passageway through which air is drawn into the compressor; and said inlet passageway further comprising a centrifugal closure apparatus, operative to close off the inlet passageway when the wheel is not rotating at a rate sufficient to preclude entry of foreign matters, but operative to open the inlet passageway when the wheel is rotating at a rate sufficient to expel foreign matters by centrifugal force.

5. The device of claim 4, wherein:

said centrifugal closure apparatus comprises a spring member having a plug attached thereto, said plug being positioned relative to the inlet passageway, such that when the wheel is rotating at said sufficient rate, the force of said spring member will be overcome by the centrifugal force on said plug to move the plug away from the inlet passageway, and such that when the wheel is rotating at less than said sufficient rate, the spring member will force the plug against the inlet passageway, thereby blocking the inlet passageway.

6. The device of claim 5, wherein:

the inlet passageway further comprises a filter, to preclude contaminants from entering the compressor.

7. The device of claim 1, wherein:

said plunger is further slidable relative the piston at maximum compression, in response to large deformation of the tire as a result of very low inflation pressure.

8. The device of claim 1, wherein:

the compressor is formed in the wheel such that said piston is responsive to centrifugal force from the rotation of the wheel to produce an intake stroke in the cylinder.

* * * * *